(12) United States Patent
Li et al.

(10) Patent No.: US 11,768,982 B1
(45) Date of Patent: Sep. 26, 2023

(54) DENSITY ABRUPT INTERFACE INVERSION METHOD AND SYSTEM BASED ON MACHINE LEARNING CONSTRAINTS

(71) Applicant: Chengdu University of Technology, Chengdu (CN)

(72) Inventors: Jun Li, Chengdu (CN); Zhengwei Xu, Chengdu (CN); Xuben Wang, Chengdu (CN); Rui Wang, Chengdu (CN); Shengxian Liang, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 0 days.

(21) Appl. No.: 18/116,877

(22) Filed: Mar. 3, 2023

(30) Foreign Application Priority Data

May 27, 2022 (CN) .......................... 202210583778.4

(51) Int. Cl.
*G06F 30/27* (2020.01)
*G06F 111/04* (2020.01)

(52) U.S. Cl.
CPC .......... *G06F 30/27* (2020.01); *G06F 2111/04* (2020.01)

(58) Field of Classification Search
CPC ....... G06F 30/27; G06F 2111/04; G06N 3/08; G01V 99/005; G01V 2210/665
See application file for complete search history.

(56) References Cited

U.S. PATENT DOCUMENTS

| 2011/0010143 A1* | 1/2011 | Dai | E21B 49/00 |
| | | | 703/2 |
| 2013/0218538 A1* | 8/2013 | Fuecker | G06F 30/23 |
| | | | 703/2 |
| 2014/0224001 A1* | 8/2014 | Eisenhauer | G01V 5/06 |
| | | | 73/61.55 |
| 2014/0233352 A1* | 8/2014 | Kacewicz | G01V 1/303 |
| | | | 367/73 |

(Continued)

FOREIGN PATENT DOCUMENTS

| CN | 105549106 A | 5/2016 |
| CN | 111337993 A | 6/2020 |

(Continued)

*Primary Examiner* — Nha T Nguyen
(74) *Attorney, Agent, or Firm* — Kaplan Breyer Schwarz, LLP; Stuart H. Mayer (57) ABSTRACT

Disclosed are a hybrid density abrupt interface inversion method based on machine learning constraints. The inversion method includes constructing an initial basin interface and randomly generating a disturbed basin interface data set; obtaining a basin interface data set through Hadamard product operation on the initial basin interface and the disturbed basin interface data set; obtaining a high-resolution density interface model data set through filling the basin interface data set with advanced functions; performing forward calculation to obtain a simulated gravity data set; carrying out mathematical transformation on the simulated gravity data set and weighting to obtain a low-resolution migration density interface model data set; optimizing a migration model-based deep learning network and mapping to obtain a high-resolution constrained density interface (Continued)

prior model; and constructing a stable nonlinear loss function and performing regularization inversion to obtain a high-resolution density interface model.

7 Claims, 4 Drawing Sheets

(56) References Cited

U.S. PATENT DOCUMENTS

| | | |
|---|---|---|
| 2014/0365193 A1* | 12/2014 | Biegert ................ G01V 99/005 703/10 |
| 2018/0202264 A1* | 7/2018 | Sarduy ................... G06N 20/00 |
| 2019/0064389 A1 | 2/2019 | Denli |
| 2020/0183041 A1 | 6/2020 | Denli |
| 2021/0041596 A1 | 2/2021 | Kushwaha et al. |
| 2022/0019933 A1* | 1/2022 | Titus ....................... G01N 25/18 |
| 2023/0041525 A1* | 2/2023 | Hong ..................... G06N 20/20 |

FOREIGN PATENT DOCUMENTS

| | | |
|---|---|---|
| CN | 113486591 A | 10/2021 |
| WO | 2012027848 A1 | 3/2012 |
| WO | 2021026545 A1 | 2/2021 |

\* cited by examiner

DENSITY ABRUPT INTERFACE INVERSION METHOD AND SYSTEM BASED ON MACHINE LEARNING CONSTRAINTS

CROSS-REFERENCE TO RELATED APPLICATIONS

This application claims priority to Chinese Patent Application No. 202210583778.4, filed on May 27, 2022, the contents of which are hereby incorporated by reference.

TECHNICAL FIELD

The application relates to the field of survey, and in particular to a density abrupt interface inversion method and system based on machine learning constraints.

BACKGROUND

Gravity anomaly comprehensively reflects the fluctuation and lithology inhomogeneity of underground density interfaces. Therefore, it is always an important content in the data processing and interpretation of potential field to invert the fluctuation shape of density interfaces through gravity anomaly. At present, the main density imaging methods include regularization inversion imaging, gravity migration imaging and deep learning imaging.

With the help of prior information, the regularization inversion method strengthens the geological significance of inversion results and improves the stability of inversion through dynamically allocating the weight between data metric space and model metric space, and enhances the change rate of adjacent density interfaces through the model multivariate density contraction operator, and improves the recognition degree of density boundaries to some extent. However, in view of the problem that the regularization inversion imaging is still relatively vague in abrupt density interface, theoretical and methodological researches on how to use geophysical data (earthquake, logging, etc.) containing rich geological significance as constraints and how to improve the imaging resolution of abrupt density interface remain to be continuously carried out.

Gravity migration, as a rapid and stable modeling technology developed in parallel with conventional inversion, solves the long-standing problems of regularization inversion, such as unstable solution and dependence on artificial geological prior information. Although the primary migration imaging is relatively stable and has a certain ability to recover the target shape, due to the constraints of similar gravity continuation theory and methods, its resolution is too low to meet the actual geological interpretation needs. Therefore, it is necessary to carry out in-depth research on how to use the low-resolution and stable primary migration imaging results and combine with other imaging methods to build a high-resolution prior model.

The deep learning has stronger generalization and expression ability to describe the characteristics of multi-level image data. With its superior feature extraction ability, underground density interface distribution is rapidly predicted by effectively extracting the internal correspondence between gravity data and high-dimensional density model, and strengthening and reconstructing the features. However, due to the limitations of the traditional gravity data set, such as weak pertinence and single input and training mode, the interpretability of the deep learning optimization process is affected, and it is impossible to determine the influence of system uncertainty caused by the depth model itself on the reconstruction density interface results. Therefore, constructing a more reasonable data set through the measured data containing rich geological significance and improving the deep learning method are the key to improve the interpretability of the deep learning optimization process.

SUMMARY

The present application provides a density abrupt interface inversion method and system based on machine learning constraints. By exploring the input mode and learning mode of deep learning, the research on the density abrupt interface inversion method based on machine learning constraints is carried out, and the accuracy of interface inversion imaging is enhanced.

In order to realize the objective, according to solutions of the present application, the density abrupt interface inversion method based on machine learning constraints includes following steps:

S1, constructing an initial basin interface based on measured gravity data, and randomly generating a disturbed basin interface data set based on the initial basin interface;

S2, obtaining a basin interface data set through Hadamard product operation based on the initial basin interface and the disturbed basin interface data set;

S3, obtaining a high-resolution density interface model data set through filling density of the overlying strata with advanced functions based on the basin interface data set;

S4, performing forward calculation on the high-resolution density interface model data set to obtain a simulated gravity data set;

S5, carrying out mathematical transformation on the simulated gravity data set and applying depth weighting to obtain a low-resolution migration density interface model data set;

S6, optimizing a migration model deep learning network based on the high-resolution density interface model data set, the simulated gravity data set and the low-resolution migration density interface model data set, and mapping the measured gravity data and a primary migration density interface model corresponding to the measured gravity data based on the migration model deep learning network to obtain a high-resolution constrained density interface prior model; and S7, constructing a stable nonlinear loss function with multivariate density contraction constraints and performing regularization inversion based on the high-resolution constrained density interface prior model to obtain a high-resolution density interface model.

Optionally, a method for constructing the initial basin interface includes determining an initial depth of the initial basin interface through a Bouguer plate model according to the measured gravity data of the basin in a target area, where a calculation formula is as follows:

$$Z_{ini} = \frac{g^{obs}\Delta\rho_0}{41.89\Delta\rho_0^2 + \beta g^{obs}}.$$

In above formula, $Z_{ini}$ is an initial depth of a basement of the basin model, $g^{obs}$ is the measured gravity data, $\Delta\rho_0$ is a density contrast between a ground surface and surrounding rock, and $\beta$ is a gradient of the density contrast varying with depth.

Optionally, a method for generating the disturbed basin interfaces includes generating a plurality of sets of disturbed basin interfaces by a plurality of random transformation methods based on probability distribution.

Optionally, the advanced functions include linear density function, polynomial density function, exponential density function, parabolic density function and hyperbolic density function.

Optionally, a method for generating the low-resolution migration density interface model data set includes performing calculation on the simulated gravity data set through an migration operator to obtain a gravity migration field, and then performing depth weighting calculation on the gravity migration field to obtain the low-resolution migration density interface model data set, where calculation formulas are as follows:

$$g^m = A^*(g_t^{syn}),$$

$$\rho_t^m = k^m W^{-2} g^m.$$

In above formula, $g^m$ is a gravity migration field, $A^*$ is a migration operator, $g_t^{syn}$ is a simulated gravity data set, $\rho_t^m$ is a low-resolution migration density interface model data set, t represents a training set, $k^m$ is a correlation coefficient, and W is a depth weighting matrix.

Optionally, a method for generating the high-resolution constrained density interface prior model includes:

S6.1, based on the low-resolution migration density interface model data set, combining with a multi-layer feature superposition structure of a variable convolution multi-scale attention mechanism three-dimensional model, increasing a network depth through a residual module, and performing strong feature extraction coding to obtain a multi-scale density model;

S6.2, based on the multi-scale density model, combining with a pyramid pooling structure for transforming to obtain a fixed-size strong feature vector;

S6.3, setting a loss function based on the fixed-size strong feature vector, and at the same time performing gravity constraint based on the simulated gravity data set to optimize the migration model deep learning network; and S6.4, performing calculation on the measured gravity data based on the migration operator, constructing the primary migration density interface model, and constructing the high-resolution constrained density interface prior model based on the primary migration density interface model and combined with a migration model optimization deep learning module.

Optionally, a calculation formula for constructing the primary migration density interface model is as follows:

$$\rho^m = k^m W^{-2} A^*(g^{obs}),$$

where $g^{obs}$ is the measured gravity data, $A^*$ is the migration operator, $\rho^m$ is the primary migration density interface model, $k^m$ is the correlation coefficient and W is the depth weighting matrix.

Optionally, a method for constructing the stable nonlinear loss function includes determining multi-source information of discrete density through logging and lithologic data analysis, constructing a multivariate density contraction function, and constructing the stable nonlinear loss function based on the contraction function.

A density abrupt interface inversion system is also provided based on machine learning constraints by the application, including an interface generation module, a Hadamard product operation module, a function filling module, a forward modeling module, a migration imaging module, a migration model optimization deep learning module and a gravity multivariate density constraint regularization inversion module.

The interface generation module is used for constructing the initial basin interface based on the measured gravity data, and randomly generating disturbed basin interfaces based on the initial basin interface.

The Hadamard product operation module is used for performing Hadamard product operation based on the initial basin interface and the disturbed basin interfaces to obtain a basin interface data set.

The function filling module is used for filling the density of the overlying strata by using the advanced functions based on the basin interface data set to obtain a high-resolution density interface model data set.

The forward modeling module is used for performing forward calculation on the high-resolution density interface model data set to obtain a simulated gravity data set.

The migration imaging module is used for carrying out mathematical transformation on the simulated gravity data set and applying depth weighting to obtain a low-resolution migration density interface model data set.

The migration model optimization deep learning module is used for optimizing a migration model deep learning network based on the high-resolution density interface model data set, the simulated gravity data set and the low-resolution migration density interface model data set and generating a high-resolution constrained density interface prior model through the measured gravity data and a primary migration density interface model corresponding to the measured gravity data.

The gravity multivariate density constraint regularization inversion module is used for calculating a high-resolution density interface model, based on the high-resolution constrained density interface prior model, by constructing a stable nonlinear loss function based on multivariate density contraction constraints.

The application has following beneficial effects.

Firstly, by using the measured gravity data in the target area, a targeted model data set is constructed to provide data support for the subsequent adaptive deep learning optimization process.

Secondly, by exploring the input mode and learning mode of deep learning, the interpretability of the learning model is improved.

Lastly, through logging and lithologic data analysis, the density abrupt interface inversion method based on machine learning constraints is studied to enhance the accuracy of interface inversion imaging.

BRIEF DESCRIPTION OF THE DRAWINGS

In order to explain the technical scheme of this application more clearly, the drawings needed in the embodiments are briefly introduced below. Obviously, the drawings in the following description are only some embodiments of this application. For ordinary technicians in this field, other drawings may be obtained according to these drawings without paying creative labor.

DETAILED DESCRIPTION OF THE EMBODIMENTS

In the following, the technical scheme in the embodiment of the application will be clearly and completely described with reference to the drawings in the embodiment of the application. Obviously, the described embodiment is only a part of the embodiment of the application, but not the whole embodiment. Based on the embodiments in this application, all other embodiments obtained by ordinary technicians in this field without creative work belong to the protection scope of this application.

In order to make the above objectives, features and advantages of this application more obvious and easier to understand, the application will be further described in detail with the attached drawings and specific embodiments.

Embodiment 1

Figure 1:
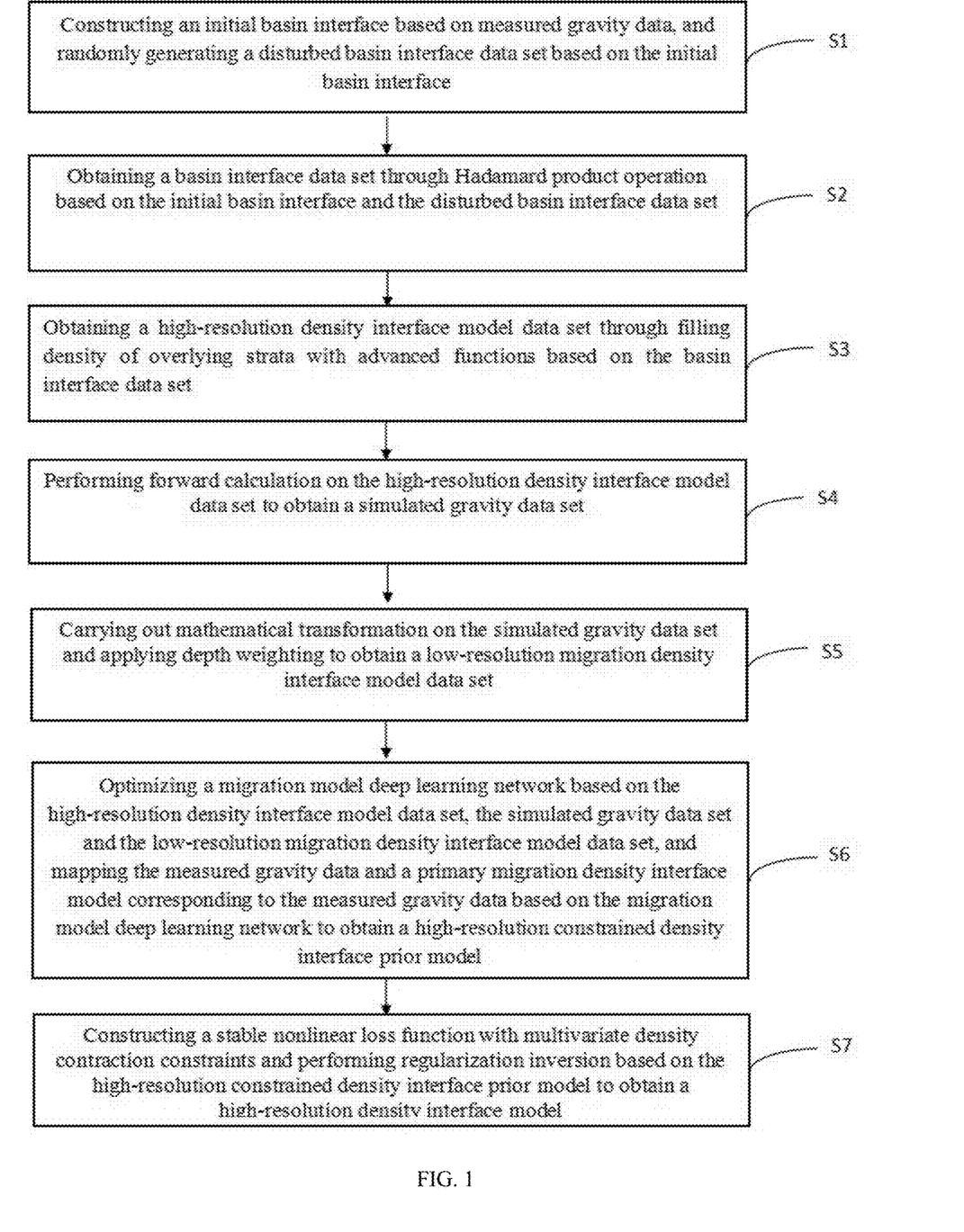
FIG. 1 is a flow chart of a density abrupt interface inversion method based on machine learning constraints.

In this embodiment, as shown in FIG. 1, a density abrupt interface inversion method based on machine learning constraints includes following steps:

S1, determining an initial basin interface through a Bouguer plate model according to the measured gravity data of the basin in a target area, where a calculation formula is as follows:

$$Z_{ini} = \frac{g^{obs}\Delta\rho_0}{41.89\Delta\rho_0^2 + \beta g^{obs}},$$

where $Z_{ini}$ is an initial depth of a basement of the basin model, $g^{obs}$ is the measured gravity data, $\Delta\rho_0$ is a density contrast between a ground surface and surrounding rock, and $\beta$ is a gradient of the density contrast varying with depth; generating a plurality of sets of disturbed basin interfaces by a plurality of random transformation methods of probability distribution based on the initial basin interface;

S2, performing Hadamard product operation between the initial basin interface and the disturbed basin interface data set to rapidly generate basin interface data set;

S3, generating a high-resolution density interface model data set through filling density of overlying strata with advanced functions, including linear density function, polynomial density function, exponential density function, parabolic density function and hyperbolic density function;

S4, performing forward calculation on the high-resolution density interface model data set to obtain a corresponding simulated gravity data set;

S5, performing calculation on the simulated gravity data set through a migration operator to obtain a gravity migration field, and then performing depth weighting calculation on the gravity migration field to obtain the low-resolution migration density interface model data set, where calculation formulas are as follows:

$$g^m = A*(g_t^{syn}),$$

$$\rho_t^m = k^m W^{-2} g^m,$$

where $g^m$ is gravity migration field, $A*$ is migration operator, $g_t^{syn}$ is simulated gravity data set, $\rho_t^m$ is low-resolution migration density interface model data set, t represents training set, $k^m$ is correlation coefficient, and W is depth weighting matrix.

Figure 2:
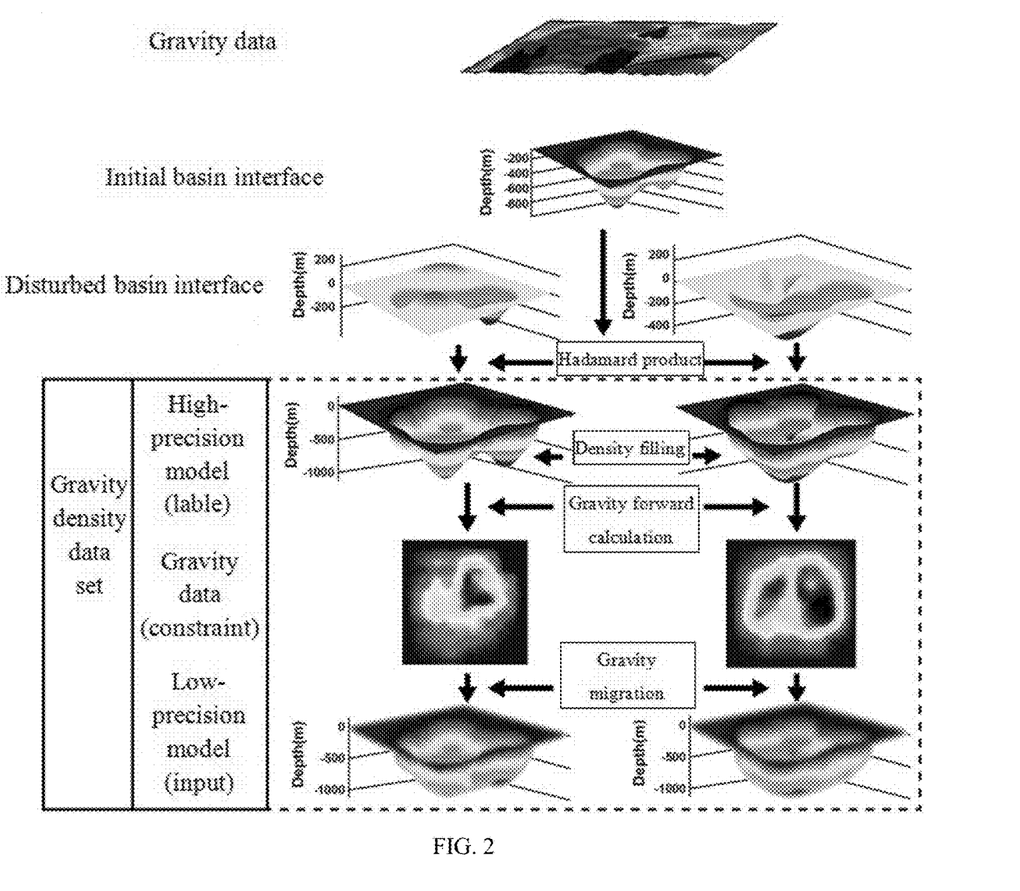
FIG. 2 is a workflow diagram of a gravity density data set of the present application.

The workflow of S1-S5 is shown in FIG. 2, including constructing the initial basin interface by using the measured gravity data of the target area; then, randomly generating the disturbed basin interface data set on the basis of the initial interface, superimposing with the initial basin interface model and filling with density; and then forming a high-resolution density interface model data set again; finally, calculating the corresponding gravity data set and the corresponding low-resolution migration density interface model data set.

Figure 3:
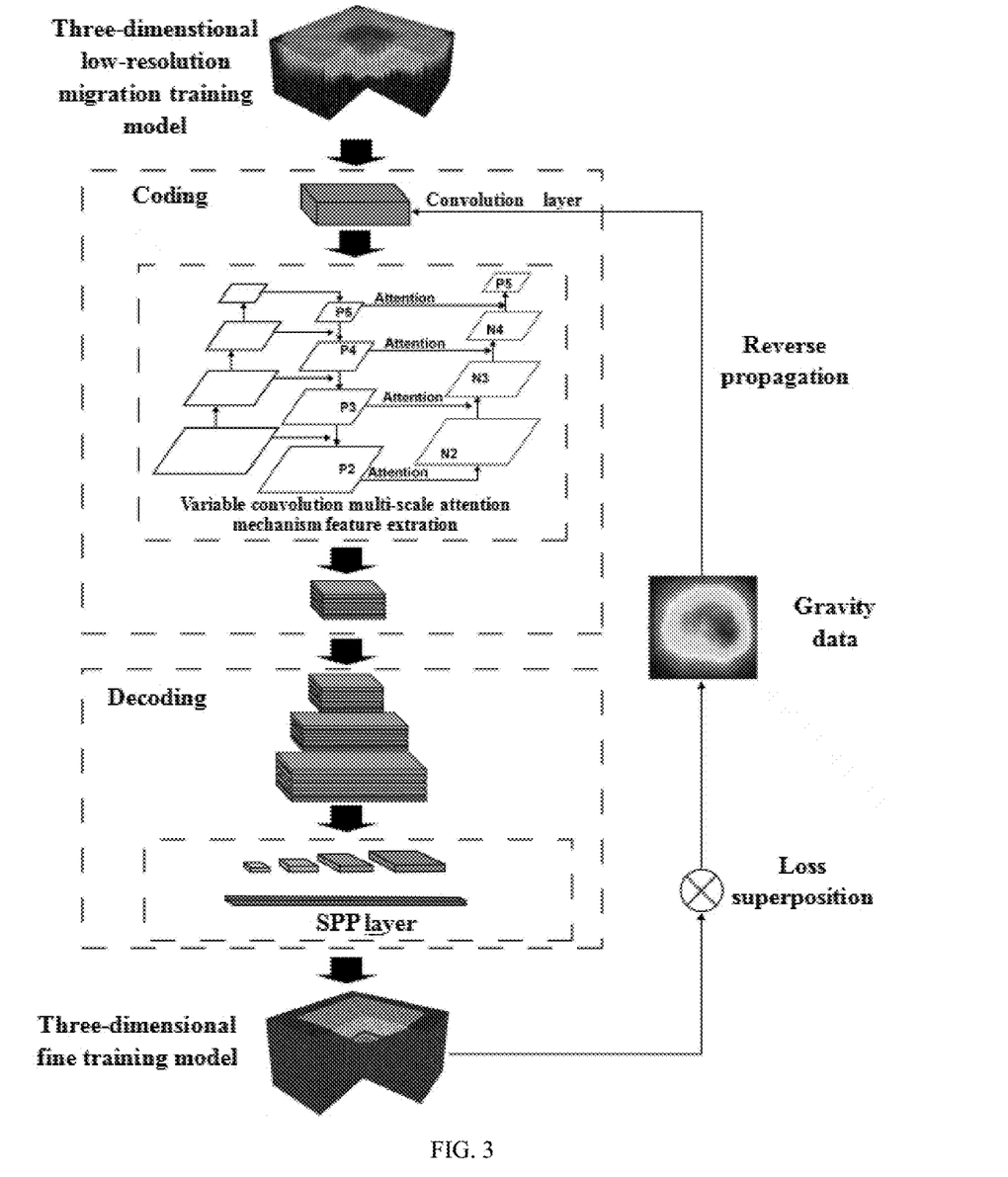
FIG. 3 is a workflow diagram of a migration model optimization deep learning network of the present application.
Figure 4:
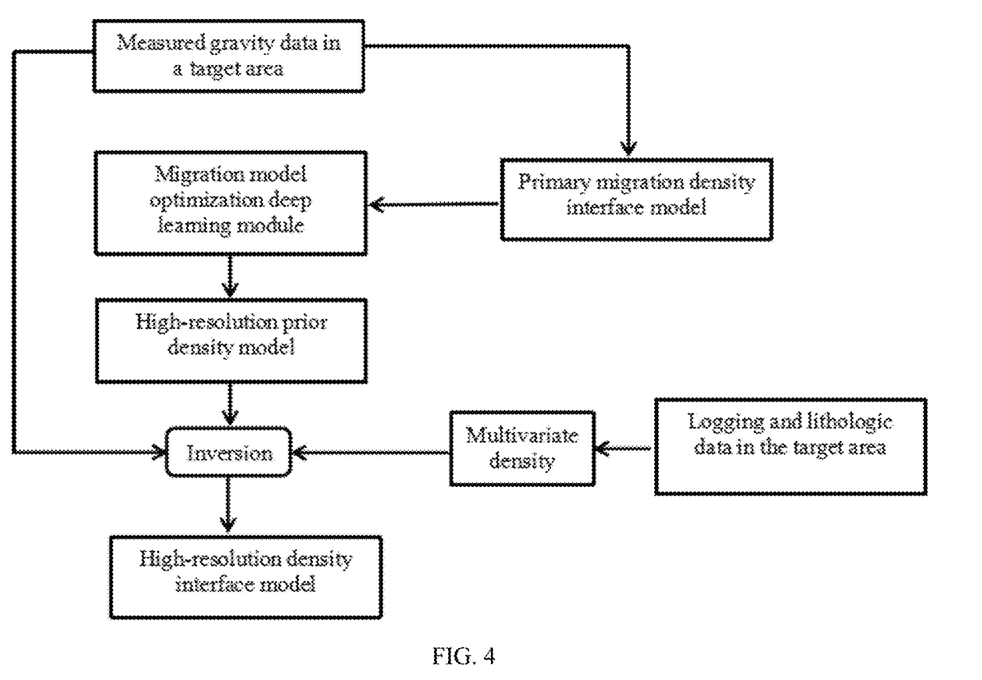
FIG. 4 is a workflow diagram of gravity multivariate density constraint regularization inversion.

S6, as shown in FIG. 3, based on the low-resolution migration density interface model data set, combining a multi-layer feature superposition structure of a variable convolution multi-scale attention mechanism three-dimensional model, increasing a network depth through a residual module, and performing strong feature extraction coding to obtain a multi-scale density model; based on the multi-scale density model, transforming through a spatial pyramid pooling (SPP) calculation to obtain a fixed-size strong feature vector; setting a loss function based on the fixed-size strong feature vector, and at the same time performing gravity constraint based on the simulated gravity data set to optimize the migration model deep learning network; and constructing the primary migration density interface model $\rho^m$ through migration algorithm, where a calculation formula is $$\rho^m = k^m W^{-2} A*(g^{obs}),$$

and combining with optimizing a migration model deep learning network, the measured gravity data and the primary migration density interface model corresponding to the measured gravity data to rapidly reconstruct a high-resolution constrained density interface prior model $\rho_{apr}$;

S7, as shown in FIG. 4, determining multi-source information (the target density, the number C of target bodies and the central value of the prior shared density information group) of discrete density through logging and lithologic data analysis, constructing a multivariate density contraction stable function in parameter domain, where a calculation formula is as follows:

$$\Phi_{FCM}(\rho, U_k, V_k) = \Sigma_{k=1}^C (\rho - V_k)^T U_k (\rho - V_k) + \eta \Sigma_{k=1}^C \|V_k - T_k\|_{L_2}^2,$$

where $U_k$ is as a group ownership matrix; as the coordinate $V_k$ of the central point of the $U_k$ classification group gradually approximates the prior matrix, and $T_k$ its approximation degree is controlled by the empirical parameter $\eta$.

A stable nonlinear loss function is established, and the stable nonlinear loss function consists of only data error function, regularization function and multivariate density contraction function. The calculation formula is as follows:

$$P^\alpha(\rho, g^{obs}) = \|A(\rho) - g^{obs}\|^2 + \alpha \|W_{em}\rho - W_{em}\rho_{apr}\|^2 + \lambda \Phi_{FCM}(\rho, U_k, V_k).$$

In the above formula, A is the gravity forward operator; $\alpha$ is a regularization factor; $\lambda$ is the contraction factor; $W_{em}$ is the product of focusing operator $W_e$ and model depth weighting operator $W_m$, where the calculation formula is as follows:

$$W_{em} = W_e W_m.$$

A conjugate gradient method is used to obtain the optimal solution p of inversion, that is, the high-resolution density interface model.

Embodiment 2

In this embodiment, a density abrupt interface inversion system is provided based on machine learning constraints, including an interface generation module, a Hadamard product operation module, a function filling module, a forward modeling module, a migration imaging module, a migration model optimization deep learning module and a gravity multivariate density constraint regularization inversion module.

The interface generation module is used for constructing the initial basin interface based on the measured gravity data, and randomly generating disturbed basin interfaces based on the initial basin interface.

The Hadamard product operation module is used for performing Hadamard product operation based on the initial basin interface and the disturbed basin interfaces to obtain a basin interface data set.

The function filling module is used for filling the density of overlying strata by using the advanced functions based on the basin interface data set to obtain a high-resolution density interface model data set.

The forward modeling module is used for performing forward calculation on the high-resolution density interface model data set to obtain a simulated gravity data set.

The migration imaging module is used for carrying out mathematical transformation on the simulated gravity data set and applying depth weighting to obtain a low-resolution migration density interface model data set.

The migration model optimization deep learning module is used for optimizing a migration model deep learning network based on the high-resolution density interface model data set, the simulated gravity data set and the low-resolution migration density interface model data set and generating a high-resolution constrained density interface prior model through the measured gravity data and a primary migration density interface model corresponding to the measured gravity data.

The gravity multivariate density constraint regularization inversion module is used for calculating a high-resolution density interface model, based on the high-resolution constrained density interface prior model, by constructing a stable nonlinear loss function based on multivariate density contraction constraints.

The above-mentioned embodiment is only a description of the preferred mode of this application, not a limitation on the scope of this application. Without departing from the design spirit of this application, various modifications and improvements made by ordinary technicians in this field to the technical scheme of this application shall fall within the scope of protection determined by the claims of this application.

What is claimed is:

1. A density abrupt interface inversion method based on machine learning constraints, comprising following steps:

S1, constructing an initial basin interface based on measured gravity data, and randomly generating a disturbed basin interface data set based on the initial basin interface;

wherein a method for constructing the initial basin interface comprises determining an initial depth of the initial basin interface through a Bouguer plate model according to the measured gravity data of the basin in a target area, a calculation formula is as follows:

$$Z_{ini} = \frac{g^{obs}\Delta\rho_0}{41.89\Delta\rho_0^2 + \beta g^{obs}}$$

$Z_{ini}$ is an initial depth of a basement of the basin model, $g^{obs}$ is the measured gravity data, $\Delta\rho_0$ is a density contrast between a ground surface and surrounding rock, and $\beta$ is a gradient of the density contrast varying with depth; and a method for generating the disturbed basin interfaces comprises generating a plurality of sets of disturbed basin interfaces by a plurality of random transformation methods based on probability distribution;

S2, obtaining a basin interface data set through Hadamard product operation based on the initial basin interface and the disturbed basin interface data set;

S3, obtaining a high-resolution density interface model data set through filling density of overlying strata with advanced functions based on the basin interface data set;

S4, performing forward calculation on the high-resolution density interface model data set to obtain a simulated gravity data set;

S5, carrying out mathematical transformation on the simulated gravity data set and applying depth weighting to obtain a low-resolution migration density interface model data set;

S6, optimizing a migration model deep learning network based on the high-resolution density interface model data set, the simulated gravity data set and the low-resolution migration density interface model data set, and mapping the measured gravity data and a primary migration density interface model corresponding to the measured gravity data based on the migration model deep learning network to obtain a high-resolution constrained density interface prior model; and S7, constructing a stable nonlinear loss function with multivariate density contraction constraints and performing regularization inversion based on the high-resolution constrained density interface prior model to obtain a high-resolution density interface model.

2. The density abrupt interface inversion method based on machine learning constraints according to claim 1, wherein the advanced functions comprise a linear density function, a polynomial density function, an exponential density function, a parabolic density function and a hyperbolic density function.

3. The density abrupt interface inversion method based on machine learning constraints according to claim 1, wherein a method for generating the low-resolution migration density interface model data set comprises performing calculation on the simulated gravity data set through an migration operator to obtain a gravity migration field, and then performing depth weighting calculation on the gravity migration field to obtain the low-resolution migration density interface model data set, wherein calculation formulas are as follows:

$$g^m = A^*(g_t^{syn})$$

$$\rho_t^m = k^m W^{-2} g^m$$

$g^m$ is a gravity migration field, $A^*$ is a migration operator, $g_t^{syn}$ is a simulated gravity data set, $\rho_t^m$ is a low-resolution migration density interface model data set, t represents a training set, $k^m$ is a correlation coefficient, and W is a depth weighting matrix.

4. The density abrupt interface inversion method based on machine learning constraints according to claim 3, wherein a method for generating the high-resolution constrained density interface prior model comprises:
  S6.1, combining with a multi-layer feature superposition structure of a variable convolution multi-scale attention mechanism three-dimensional model based on the low-resolution migration density interface model data set, increasing a network depth through a residual module, and performing strong feature extraction coding to obtain a multi-scale density model;
  S6.2, combining with a pyramid pooling structure for transforming to obtain a fixed-size strong feature vector based on the multi-scale density model;
  S6.3, setting a loss function based on the fixed-size strong feature vector, and performing gravity constraints based on the simulated gravity data set to optimize the migration model deep learning network; and
  S6.4, performing calculation on the measured gravity data based on the migration operator, constructing the primary migration density interface model, and constructing the high-resolution constrained density interface prior model based on the primary migration density interface model and combined with a migration model optimization deep learning module.

5. The density abrupt interface inversion method based on machine learning constraints according to claim 4, wherein a calculation formula for constructing the primary migration density interface model is as follows:

$$\rho^m = k^m W^{-2} A^*(g^{obs}),$$

wherein $g^{obs}$ is the measured gravity data, $A^*$ is the migration operator, $\rho^m$ is the primary migration density interface model, $k^m$ is the correlation coefficient and $W$ is the depth weighting matrix.

6. The density abrupt interface inversion method based on machine learning constraints according to claim 1, wherein a method for constructing the stable nonlinear loss function comprises determining multi-source information of discrete density through logging and lithologic data analysis, constructing a multivariate density contraction function, and constructing the stable nonlinear loss function based on the contraction function.

7. A system, comprising:
  one or more processors; and
  memory storing one or more programs configured to be executed by the one or more processors, the one or more programs including instructions for:
  constructing an initial basin interface based on measured gravity data, and randomly generating disturbed basin interfaces based on the initial basin interface, wherein the constructing the initial basin interface comprises determining an initial depth of the initial basin interface through a Bouguer plate model according to the measured gravity data of the basin in a target area, and wherein a calculation formula is as follows:

$$Z_{ini} = \frac{g^{obs} \Delta \rho_0}{41.89 \Delta \rho_0^2 + \beta g^{obs}};$$

wherein $Z_{ini}$ is an initial depth of a basement of a basin model, $g^{obs}$ is the measured gravity data, $\Delta \rho_0$ is a density contrast between a ground surface and surrounding rock, and $\beta$ is a gradient of the density contrast varying with depth; and
  wherein the generating the disturbed basin interfaces comprises generating a plurality of sets of disturbed basin interfaces by a plurality of random transformation methods based on probability distribution;
  performing Hadamard product operation based on the initial basin interface and the disturbed basin interfaces to obtain a basin interface data set;
  filling the density of overlying strata by using the advanced functions based on the basin interface data set to obtain a high-resolution density interface model data set;
  performing forward calculation on the high-resolution density interface model data set to obtain a simulated gravity data set;
  carrying out mathematical transformation on the simulated gravity data set and applying depth weighting to obtain a low-resolution migration density interface model data set;
  optimizing a migration model deep learning network based on the high-resolution density interface model data set, the simulated gravity data set and the low-resolution migration density interface model data set and generating a high-resolution constrained density interface prior model through the measured gravity data and a primary migration density interface model corresponding to the measured gravity data;
  calculating a high-resolution density interface model, based on the high-resolution constrained density interface prior model and by constructing a stable nonlinear loss function based on multivariate density contraction constraints.

* * * * *